United States Patent
Plojhar et al.

(10) Patent No.: US 7,271,993 B2
(45) Date of Patent: Sep. 18, 2007

(54) CONTROL OF CURRENT IN AN INDUCTANCE WITH PULSE WIDTH MODULATION AT CONTROL FREQUENCY

(75) Inventors: Jan Plojhar, Mokra-Horakov (CZ); Bart De Cock, Wijgmaal (BE)

(73) Assignee: AMI Semiconductor Belgium BVBA, Oudenaarde (BE)

( * ) Notice: Subject to any disclaimer, the term of this patent is extended or adjusted under 35 U.S.C. 154(b) by 416 days.

(21) Appl. No.: 10/899,653

(22) Filed: Jul. 27, 2004

(65) Prior Publication Data

US 2005/0040880 A1 Feb. 24, 2005

(30) Foreign Application Priority Data

Jul. 28, 2003 (GB) ................... 0317629.4

(51) Int. Cl.
*H01H 47/00* (2006.01)
(52) U.S. Cl. ................. 361/154; 318/293; 318/599
(58) Field of Classification Search ............. 361/159; 388/811
See application file for complete search history.

(56) References Cited

U.S. PATENT DOCUMENTS

| 4,475,086 | A | * | 10/1984 | Allen ........................ 327/38 |
| 4,710,686 | A | * | 12/1987 | Guzik ....................... 318/293 |
| 4,757,241 | A | | 7/1988 | Young ....................... 318/254 |
| 5,428,522 | A | | 6/1995 | Millner et al. ............... 363/63 |
| 6,342,822 | B1 | * | 1/2002 | So ........................... 332/109 |
| 2003/0080710 | A1 | * | 5/2003 | Tierling ..................... 318/801 |

FOREIGN PATENT DOCUMENTS

| DE | 19742370 A1 | 4/1998 |
| DE | 19704089 A1 | 8/1998 |
| JP | 2002204150 | 7/2002 |

OTHER PUBLICATIONS

Four-Quadrant Sensorless Brushless ECM Drive; R.C. Becerra, T.M. Jahns, M. Ehsani, 1991 IEEE pp. 202-209 (Article 1).
Dual-Stepping Motor Driver IC Using PWM Chopper, XP-002433646, Mar. 09, 1999 (Article 2).
XP-002433648, TLE 472x Stepper Motor Drivers Current Control Method and Accuracy, pp. 1-4, V1.1, May 2001 (Article 3).
XP-002433647, Microstepping DMOS Driver With Translator, pp. 1-18 (Article 4).
European Search Report; Reference No.: A2887-EP, Application No.: 04077147.9-2207.

* cited by examiner

*Primary Examiner*—Stephen W. Jackson
*Assistant Examiner*—Christopher J Clark
(74) *Attorney, Agent, or Firm*—Workman Nydegger

(57) ABSTRACT

A PWM controller for a bridge driver circuit for controlling current in an inductive load such as a motor, can set the driver into a forward mode, a slow decay mode or a fast decay mode, and can switch from slow decay mode into forward mode or into fast decay mode for the duration of pulses at controlled time intervals to provide pulse width modulated control of the current. This is a simpler control scheme avoiding complex switching schemes related to mixed mode decay. By using a controlled PWM frequency, it is easier to avoid the problems of variable frequency such as increased heat dissipation or acoustic noise generation. It can have a selector for selecting top or bottom sense switching, enabling a wider range of stable PWM duty-cycles to be used (e.g. 0% to 100%), which is useful to compensate for Back emf influence on coil-drive.

21 Claims, 4 Drawing Sheets

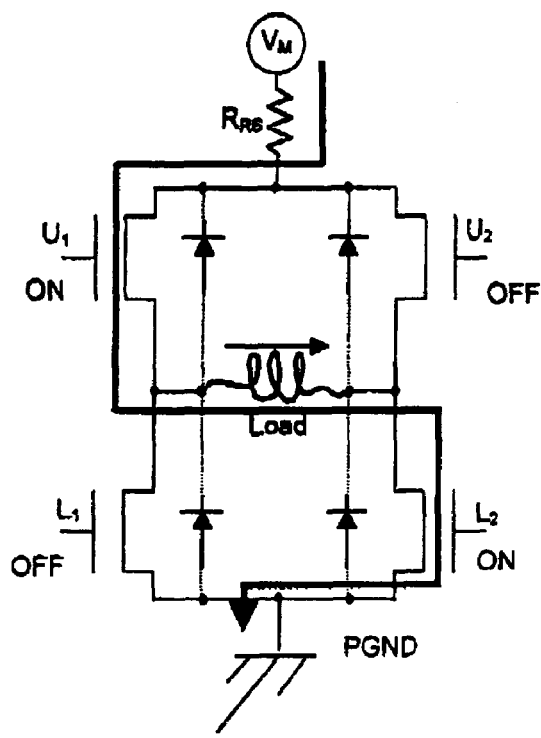
Fig. 1 – Prior art
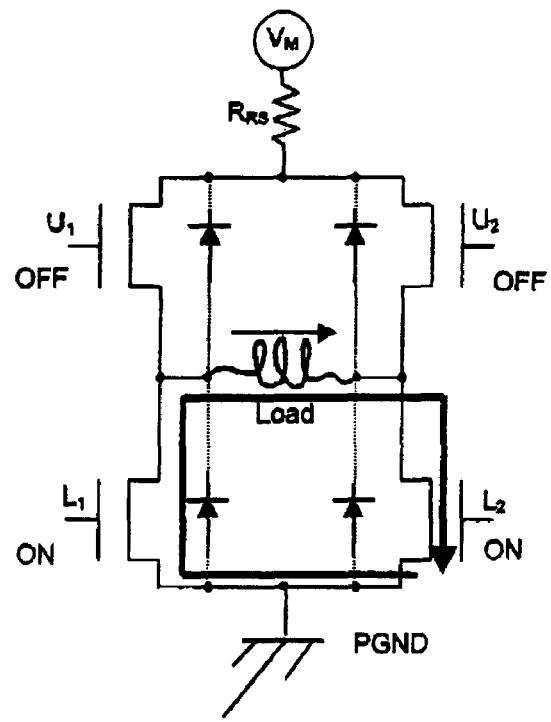
Fig. 2 – Prior art

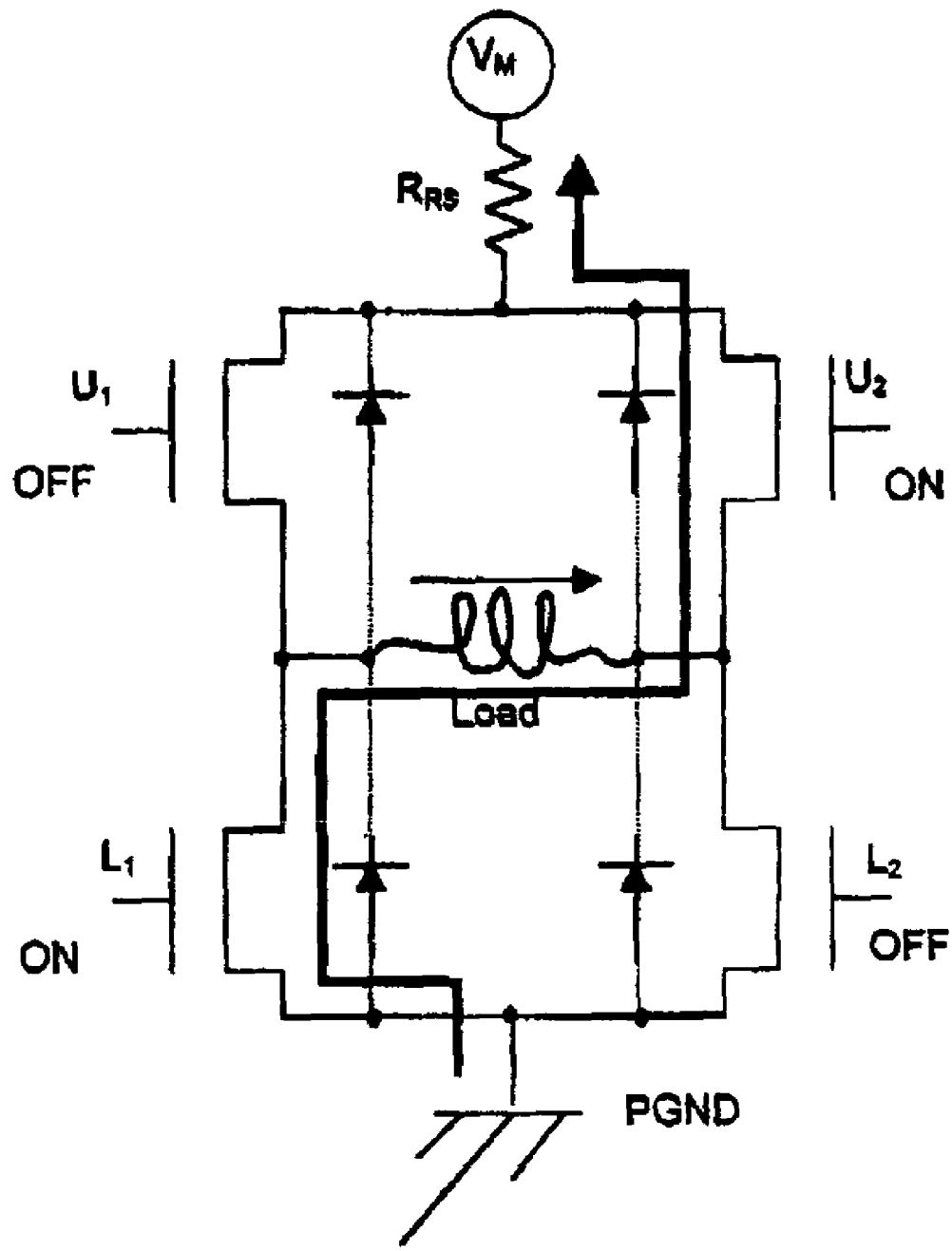
Fig. 3 – Prior art

CONTROL OF CURRENT IN AN INDUCTANCE WITH PULSE WIDTH MODULATION AT CONTROL FREQUENCY

THE FIELD OF THE INVENTION

This application claims priority under 35 U.S.C. 119 to patent application number 0317629.4 filed in the United Kingdom on Jul. 28, 2003, which is incorporated by reference herein in its entirety.

BACKGROUND OF THE INVENTION

1. Cross-Reference to Related Applications

This invention relates to controllers for controlling current in an inductive load, to integrated circuits or systems having such controllers and to corresponding methods.

2. Background and Relevant Art

It is known to control current in an inductive load (such as a coil, a solenoid and a motor winding) by means of Pulse Width Modulation (PWM) and driver transistors in a full-bridge configuration. Based on measurements of the coil current, a controller executes a decision process to determine when to switch the drivers. A coil current sensor circuit is used to measure the coil current and feed back a measure of the coil current. This value is compared to a reference signal indicating a desired current, to produce a current error signal. The controller alters the timing of the switching dynamically to minimize the error signal. Typically the drivers are arranged as an H bridge to enable a DC supply voltage to be switched to drive the coil alternately with positive and negative voltages. Such drivers have a number of driving modes as follows: forward (also known as charge mode, with a positive drive voltage), fast decay (with a negative drive voltage) and slow decay (also called freewheel, with no drive voltage, but with the coil short circuited to allow the induced current to flow and decay). These modes are switched at different times to provide pulse width modulated control. The waveform of each pulse can be varied by using a mixture of the three modes within a single cycle of the PWM. This is shown as a mixed decay mode.

FIGS. 1, 2 and 3 show a current flow through a known H bridge in forward mode, slow decay mode and fast decay mode respectively. The H bridge has transistors U1, L1 coupled in series between the supply lines Vm and PGND and transistors U2, L2 are likewise coupled in series. Parasitic diodes are shown with dotted lines across each transistor. The inductive load, e.g. a coil, is connected across the mid points of the transistor pairs UI-L1, U2-L2. In the forward mode shown in FIG. 1, transistors UI and L2 are on and transistors U2 and L1 are off, so the current flows from supply line Vm through transistor UI then the inductive load, here a coil, then transistor L2 and to supply line PGND. In the slow decay mode shown in FIG. 2, transistors UI and U2 are off and transistors LI and L2 are on so the current flows from the coil or inductive load through transistor L2 to supply line PGND, to transistor L1 and back to the coil or inductive load. In the fast decay mode shown in FIG. 3, transistors UI and L2 are off and transistors L1 and U2 are on so the current flows from supply line PGND to transistor LI to the coil or inductive load, to transistor U2, then to supply line Vm. Many different ways of controlling the switching of the drivers for switching the transistors UI, U2, L1, L2 to control the coil current are known.

For example, the switching can be carried out at a fixed frequency or variable frequency. One variable frequency method is called peak current control with fixed off time. This involves switching into freewheel or slow decay mode for a fixed time interval, and then driving the coil or inductive load until the current reaches the desired reference value. In this case the driving period varies and so the switching frequency varies. This is also called top sensing since switching occurs to make the top of the pulses match the desired current level. Another method is peak current control with fixed frequency. In this case, the freewheel time is not fixed, but the total of drive time and freewheel time is fixed, so the switching has a fixed frequency. It is also known to have mean value control to address the issue that peak control gives a mean output which is always lower than the reference current.

One known controller is the Allegro 3977 integrated circuit (IC). It uses a mixed decay mode with fixed off-time in its PWM current regulators, which limits the load current to a desired value. Initially, a diagonal pair of source and sink transistors are enabled and current flows through the inductive load as shown in FIG. 1. When the load current has the desired value, a current-sense comparator resets the PWM latch, which turns off both the source and the sink transistors in order to obtain mixed decay mode, and the current recirculates as in FIGS. 2 and 3. During this recirculation the current decreases until the fixed off-time expires. Mixed decay splits the fixed off-time of the PWM cycle into fast and then slow decay. After the fixed off-time of the PWM cycle, the appropriate transistors are enabled again, the inductive load current increases and the PWM cycle is repeated. Using mixed decay with fixed off-time has the advantage that PWM frequency is variable (lower peak in EMC spectrum, because energy in spectrum is smeared), but it needs relatively high frequency to guarantee operation above 20 kHz and this generates additional heat-losses. There are also external components involved, which adds to the cost and complexity. This prior art, which shows current-control with non-constant frequency PWM has the potential effect that PWM frequency could drop below 20 kHz (commonly used as an acceptable audible limit). The frequency variation is related to PWM generation of the current-control block that depends on coil-inductance, supply voltage, motor speed, current levels and other parameters. This can cause audible noise and related human discomfort.

Another known controller is the Infineon TLE-472x series ICs. These use a fixed frequency chopper with forward drive and brake (=slow decay) mode. Current-switching is top-sensing only. This known device apparently does not use a fast decay mode. Draw-backs of this include slow reaction time in certain motor load conditions and speeds: PWM duty cycle will be less than 50%.

Another known device is the Toshiba TB62200. This uses fixed frequency PWM with slow, fast and mixed decay. Using mixed decay mode, which requires additional switching points involves increased complexity. There is no indication of using other than top sensing.

U.S. Pat. No. 5,428,522 shows a four quadrant unipolar pulse width modulated (PWM) power conversion circuit for supplying a desired current to an inductive load such as a motor. The power conversion circuit uses an H-bridge circuit topology having an upper pair and lower pair of switching elements wherein the load is connected across a positive potential and negative potential DC power source. Diodes in parallel with each of the switching elements provide a current path from the load to the power source when its respective switching element is non-conductive. The value of the load current is compared to a desired load current value and switching element control signals are generated in accordance with a control algorithm to cause the instantaneous voltage across the load to alternate between a single polarity voltage and zero for a portion of the output load waveform to cause the average value of the load current to correspond generally with the desired average load current.

U.S. Pat. No. 4,757,241 is concerned with the problem that PWM systems which regulate current have required continuous monitoring of load current to avoid uncontrolled high frequency switching, or have exhibited discontinuity in control output when load current approaches the regulated value, or have not provided for a smooth transition from a current control mode to a voltage control mode. Two known methods to address this employ either a free-running oscillator to establish a fixed maximum frequency of operation or a monostable timer to establish a fixed off time. Each of these circuits have their advantages and disadvantages. To overcome the disadvantages, a logic means limits the cycling of the PWM enable signal to once per clock interval, and if desired, the logic means can establish a minimum time period during each clock interval in which the PWM enable signal may be inhibited in order to provide a minimum OFF interval for current decay in each cycle.

BRIEF SUMMARY OF THE INVENTION

According to a first aspect, the invention provides: a controller for a bridge driver circuit for pulse width modulated control of a current in an inductive load, the controller being arranged to set the driver into a forward mode, a slow decay mode or a fast decay mode, and being arranged to switch from slow decay mode into forward mode or into fast decay mode for the duration of pulses at controlled time intervals to provide pulse width modulated control of the current.

This can offer a simpler control scheme with lower complexity by multiplexing forward mode and fast decay mode over different PWM periods and thus avoiding complex switching schemes related to mixed mode decay. By imposing a controlled frequency, it is easier to avoid the problems of weakly controlled PWM frequency such as increased heat dissipation or acoustic noise generation.

As additional features, the controller can have a selector for selecting top or bottom sense switching. This is notable for enabling a wider range of PWM duty-cycles to be used (e.g. 0% to 100%), which is useful to compensate for Back emf (Bemf) influence on coil-drive.

Another such feature is this selector being arranged to select according to a duty cycle or mark space ratio of an output of the controller. This enables output instability to be detected, such as that caused by changes in back emf. This can employ a simple detector circuit for detecting when the duty cycle or mark space ratio reaches a pre-determined value between 0.5 and 1, e.g. 0.75, and using this to make the selection. The selector for selecting top or bottom sense switching may have an instability sampling point anywhere between 50% and 100% of the duty cycle. The position is a compromise between fast reaction time (switching when the ratio is just above 50%, or thus the value is just above 0.5) and stable operation on noisy environment (switching when the ratio is about 100%, or thus the value is almost and up to 1).

Another additional feature is a current sensor in the load coupled to provide feedback to the controller.

Another such feature is a latch for outputting a drive control signal, the latch being set by a clock signal and reset by a signal indicating the coil current has reached a desired level.

Another such feature is the controller being arranged to delay a switching of the bridge driver to provide a guard band to avoid an overlap between modes which could lead to a brief short circuit.

Another aspect of the invention provides a pulse width modulation controller for pulse width modulated controlling of current in an inductive load according to a comparison of a desired and a measured current, the controller being arranged to carry out top sensing where for each pulse, the current is driven up until it reaches the desired value, after which it is allowed to decay or to carry out a bottom sensing where for each pulse, the current is driven away from the desired value and allowed to decay towards the desired value, the controller having a selector for selecting top or bottom sense switching. As discussed above, this is notable for enabling a wider range of PWM duty-cycles to be used (e.g. 0% to 100%), which is useful to compensate for back emf influence on coil-drive. The selector can be arranged to select according to a duty cycle or mark space ratio of an output of the controller. This enables output instability to be detected, such as that caused by changes in back emf. This can employ a simple circuit for detecting when the duty cycle or mark space ratio reaches a pre-determined value between 0.5 and 1, e.g. 0.75.

The embodiments of the invention using some or all of the above features have a number of advantages:

1) PWM frequency is fully controlled by means of a clock signal, such that audible noise and overheating can be avoided in all operating conditions. There are no other components needed to tune the PWM frequency to motor parameters and operating conditions.

2) All PWM duty-cycles can be reached (0% to 100%), which is important to compensate Bemf influence on coil-drive.

3) PWM generation is simple as it does not implement mixed decay mode. It uses only slow or fast decay mode per PWM period. There are no additional switching points per PWM period necessary, so no additional hardware is required to control and generate the switching point between fast and slow decay.

Other aspects of the invention include an integrated circuit incorporating the controller.

Another aspect provides a system having the controller, and a motor as the inductive load controlled by the controller. As the advantages feed through to add value to the system as a whole, it is useful to claim the system explicitly.

Other aspects include corresponding methods of controlling a current in an inductive load.

A method of controlling a current in an inductive load by switching between a forward mode, a slow decay mode or a fast decay mode according to the present invention comprises switching from slow decay mode into forward mode or into fast decay mode for the duration of pulses at controlled time intervals to provide pulse width modulated control of the current. This offers a simpler control scheme with lower complexity by multiplexing forward mode and fast or slow decay mode over different PWM periods and thus avoiding complex switching schemes related to mixed mode decay.

A method according to the present invention may furthermore comprise selecting top or bottom sense switching. Selecting top or bottom sense switching may be done according to a duty cycle of an output of the controller. A method according to the present invention may furthermore comprise detecting when the duty cycle reaches a pre-determined value between 0.5 and 1, e.g. 0.75, and use this to select top or bottom sense switching.

A method according to the present invention may furthermore comprise sensing a current in the inductive load to provide feedback control.

A drive control signal may be output, which drive control signal is set by a clock signal and is reset by a signal indicating a current in the inductive load has reached a desired level.

Switching between a forward mode, a slow decay mode or a fast decay mode may be delayed to provide a guard band to avoid an overlap between modes.

In a further aspect, the present invention provides a method of controlling a current in an inductive load by pulse width modulation according to a comparison of a desired and a measured current. The method comprises selecting between top sensing where for each pulse the current is driven up until it reaches a desired value after which it is allowed to decay, or bottom sensing where for each pulse the current is driven away from the desired value and allowed to decay towards the desired value. Selecting may be arranged according to a duty cycle of an output of a controller controlling the current in the inductive load.

How the present invention may be put into effect will now be described with reference to the appended schematic drawings. Obviously, numerous variations and modifications can be made without departing from the claims of the present invention. Therefore, it should be clearly understood that the form of the present invention is illustrative only and is not intended to limit the scope of the present invention

BRIEF DESCRIPTION OF THE DRAWINGS

The features of the invention will be better understood by reference to the accompanying drawings, which illustrate preferred embodiments of the invention. In the drawings:

FIGS. 1 to 3 show a prior art bridge driver and current flows in forward mode, in slow decay mode and in fast decay mode respectively.

DETAILED DESCRIPTION OF THE PREFERRED EMBODIMENTS

Figure 4:
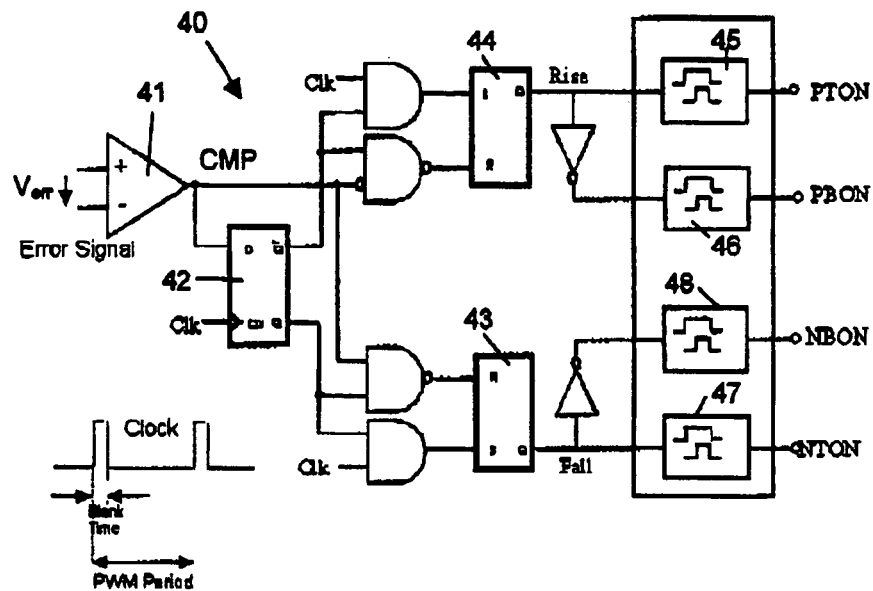
FIG. 4 shows a controller according to a first embodiment of the invention in the form of a circuit for generating rise and fall pulses for the forward and fast decay modes respectively.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

A useful discussion of PWM control of inductive loads such as motors can be found in "Power Electronics and Variable Frequency Drives", ed. B. K. Bose, IEEE press, 1997, especially chapter 4. Reference is made below to logic circuits. A useful discussion of logic circuits can be found in "Digital Logic Design", B. Holdsworth and C. Woods, Newnes, 2002.

A term often used in PWM control is "Duty cycle" or "mark space ratio". This is a number that varies between 0 and 1 (or for example between 0% and 100%). It is the ratio of "active PWM signal"="PWM signal high" and the PWM signal's period or in other words: $T_{on}/T_{pwm}$ period.

Figure 5:
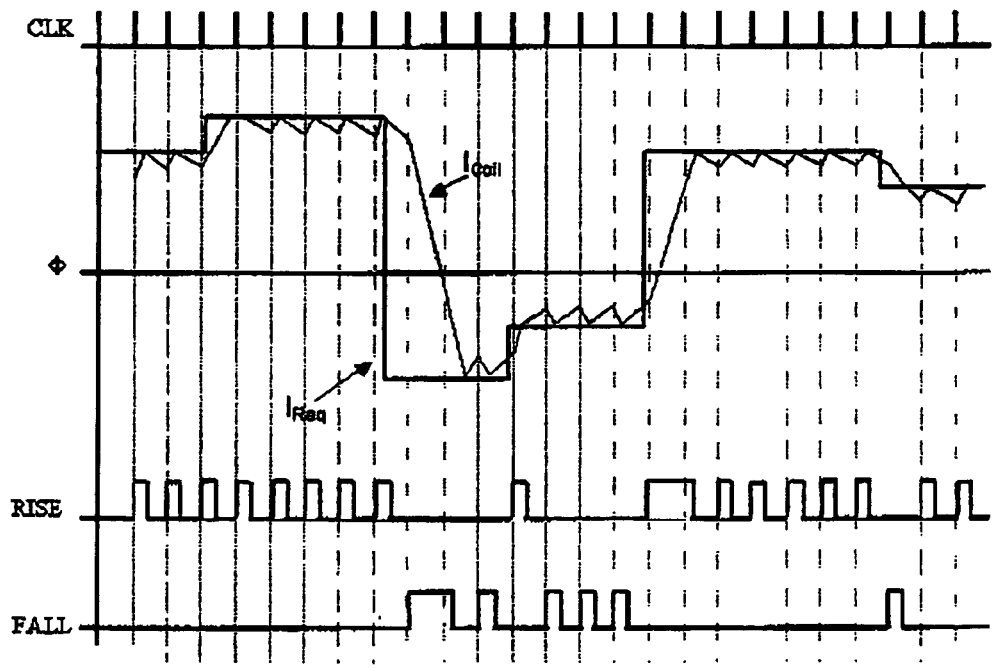
FIG. 5 shows a graph of the operation of the circuit of FIG. 4.

FIGS. 4, 5: Four Quadrant Controller

FIG. 4 shows a controller 40 according to an embodiment of the invention. The controller 40 makes decisions based on the comparison $V_{err}$ of the value of a measured current $I_{coil}$ in an inductive load, e.g. a coil-current, with the value of a desired coil-current $I_{Req}$. Using any suitable current sensing circuit (e.g. the voltage drop over a resistor in series with the coil) in combination with a comparator 41, a compare signal CMP is generated (FIG. 4). The circuit also takes in a clock signal Clk and outputs logic signals PTON, NTON, PBON, NBON for driving 4 logic circuits of a bridge. The signal CMP indicates whether the current regulation error Verr is positive or negative. This is latched by a latch circuit 42, e.g. a D-type latch clocked by the clock signal Clk on the clock input. In the D type latch 42, when the CLK input is logic 1, the Q output will always reflect the logic level present at the D input, no matter how that changes. When the CLK input falls to logic 0, the last state of the D input is trapped and held in the latch, for use by the subsequent circuit that needs this signal.

The latched output Q and its inverse !Q are fed to a pair of set/reset devices 43, 44 which output a fall signal Fall and a rise signal Rise respectively. To achieve this, the positive output Q of the latch circuit 42 is preferably NANDed with the comparator output CMP and applied to the reset input R of a first set/reset device 43. The set input S of this first set/reset device 43 is the positive output Q of the latch circuit 42 ANDed with the clock signal Clk. The reset input R of the second set/reset device 44 is the inverted output !Q of the latch circuit 42 NANDed with the inverse of the comparator output CMP. The set input S of the second set/reset device 44 is the inverted output !Q of the latch circuit 42 ANDed with the clock signal Clk.

The circuit functions as follows. When the measured coil current $I_{coil}$ is larger than the desired coil current $I_{Req}$, the comparator signal CMP is positive, and a logic 1 is applied to the D input of the latch circuit 42. The output Q of the latch circuit 41 follows the D input, and during a 0 clock signal Clk, the state of the D input is trapped, in this case a logic 1. This means that the output Q of the first set/reset device 43 will be at a logic 1 as well, and that a fall signal Fall with a logic 1 will be generated. At the same time, the output Q of the second set/reset device 44 is at a logic 0, and a rise signal Rise with a logic 0 will be generated. On the other hand, when the measured coil current $I_{coil}$ is smaller than the desired coil current $I_{Req}$, the comparator signal CMP is negative, and a logic 0 is applied to the D input of the latch circuit 42. The output Q of the latch circuit 41 follows the D input, and during a 0 clock signal Clk, the state of the D input is trapped, in this case a logic 0. This means that the output Q of the first set/reset device 43 will be at a logic 0 as well, and that a fall signal Fall with a logic 0 will be generated. At the same time, the output Q of the second set/reset device 44 is at a logic 1, and a rise signal Rise with a logic 1 will be generated.

The Rise signal and an inverted Rise signal are each fed through a delay device 45, 46 to delay a leading edge, to achieve a dead band or guard band, then output as PTON and PBON respectively. The Fall signal and an inverted Fall signal are each fed through a delay device 47, 48 to delay a leading edge, to achieve a dead band or guard band, then output as NTON and NBON respectively. In the first case, the measured coil current $I_{coil}$ being larger than the desired coil current $I_{Req}$ at a certain pulse of the clock signal Clk, the coil current is driven so as to decrease. At the moment both currents $I_{coil}$ and $I_{Req}$ become equal, possibly between two pulses of the clock signal Clk, the Fall signal falls back to logic zero, and the measured coil current, not being driven to decrease, automatically increases again. In the second case, the measured coil current $I_{coil}$ being smaller than the desired coil current $I_{Req}$, at a certain pulse of the clock signal Clk, the coil current is driven so M to increase. At the moment both currents $I_{coil}$ and $I_{Req}$ become equal, possibly between two pulses of the clock signal Clk, the Rise signal falls back to logic zero, and the measured coil current, not being driven to increase, automatically decreases again.

As shown in the graph of FIG. 5, the Rise and Fall signals are pulsed at varying widths to drive the coil current $I_{coil}$ up or down to match the requested current $I_{Req}$. These are the forward and fast decay modes as shown in FIGS. 1 and 3. In between the pulses, when neither the Rise nor the Fall signals are present, the driver is in the slow decay mode of FIG. 2. This shows 4 quadrant current control with automatic selection of Rise or Fall once per clock cycle, to achieve the advantages set out above.

Figure 6:
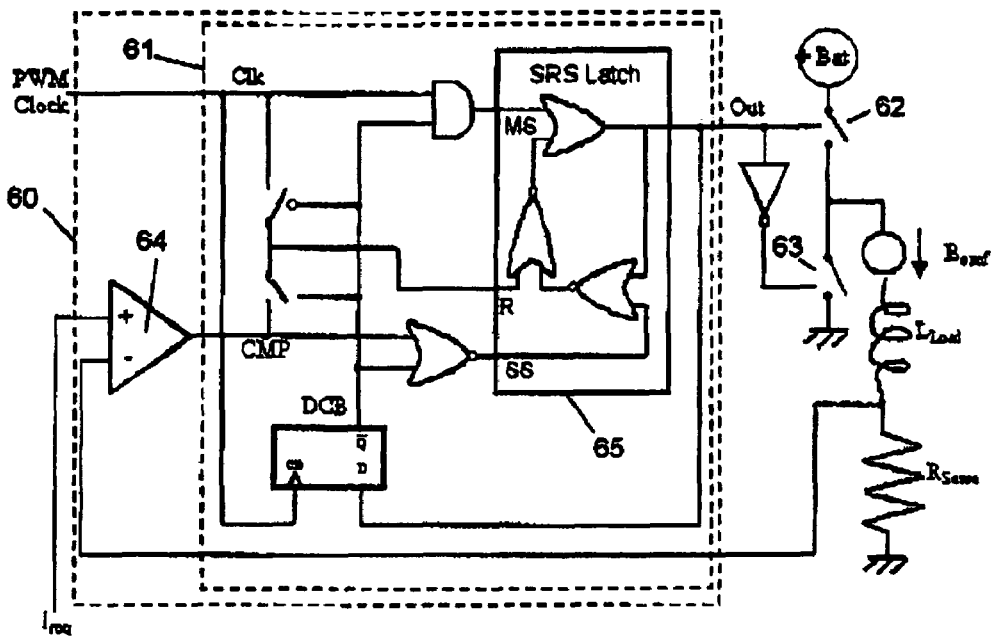
FIG. 6 shows a controller according to a second embodiment of the invention having a circuit for selecting between top sensing and bottom sensing.
Figure 7:
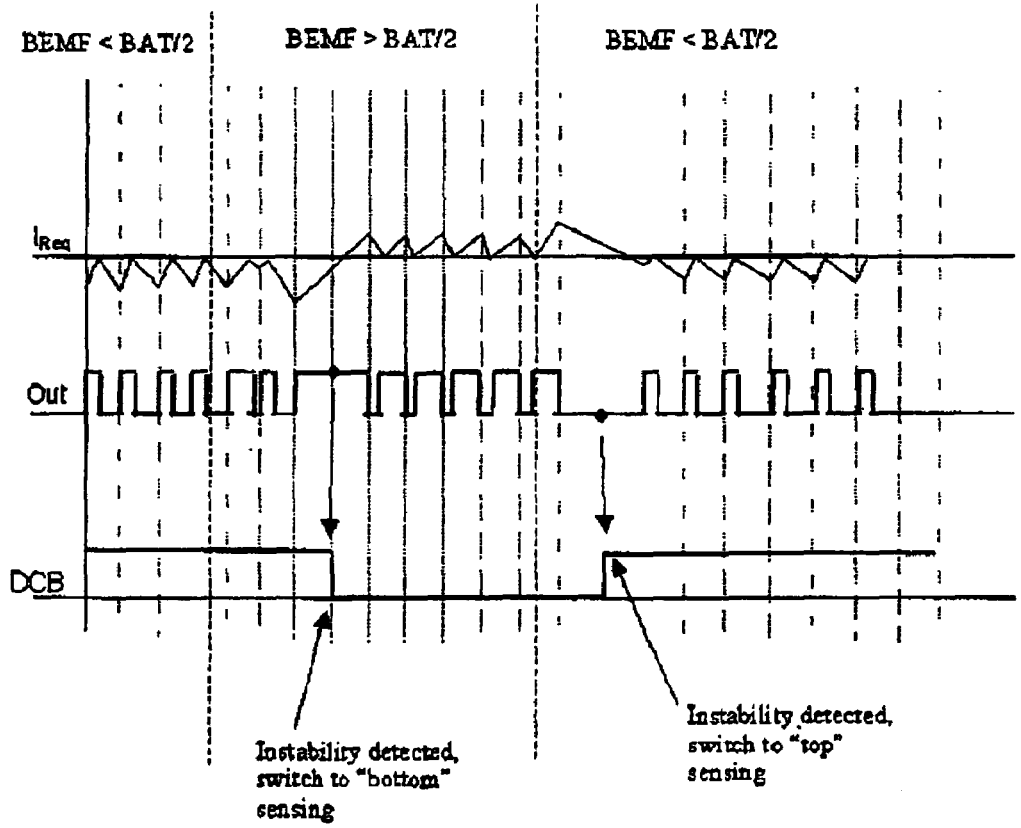
FIG. 7 shows a graph of the operation of the circuit of FIG. 6.

FIGS. 6 7 Top: and Bottom Sensing Selection

FIG. 6 shows another embodiment of the invention in the form of a controller 60 having a digital logic circuit 61 for achieving more stable control over a wider range of duty cycles. It has automatic selection of top sensing or bottom sensing control. It is shown for controlling one pair of switches 62, 63, e.g. transistors, but can be applied equally to the 4 quadrant case of FIG. 4. It has the PWM clock and a voltage $I_{req}$ indicating the required current as inputs. A single output Out is used in inverted and non-inverted forms to drive the pair of switches 62, 63, e.g. transistors, used to drive the load $L_{load}$. A sense resistor $R_{sense}$ is coupled in the path of the coil current. A signal indicating the voltage across the sense resistor $R_{sense}$ which represents the coil current is fed back to a comparator 64 for comparison with the required current $I_{req}$.

The operation of the circuit 60 is shown in the graph of FIG. 7. A signal to trigger the switch between bottom and top sensing is labelled DCB. As shown in the graph this signal DCB is switched when an instability is detected in the form of a state: "required current is not reached –no switching event in this PWM period detected". This can happen if the back emf $B_{emf}$ increases to greater than 50% of battery voltage +Bat for top sensing. The graph also shows it happening if the back emf $B_{emf}$ drops below 50% of battery voltage+Bat for bottom sensing. In either case, the DCB signal causes a switch between bottom and top sensing to make sure that the duty cycle is maintained consistently between 0% and 100%. Without this automatic selection between top and bottom sensing, when duty cycles are reaching 50%, the PWM duty cycle would oscillate over different PWM periods between two states: (a) values different from 0% and 100% and (b) values equal to 100% or equal to 0%. This effect is also visible in FIG. 7, indicated by the arrows "instability detected". The top-bottom sensing selection limits the duration of this instability to the periods of detection.

The controller output is provided by an SRS latch 65. An MS input of the latch 65 is driven by the DCB signal ANDed with the clock signal Clk. An R input of the latch 65 is driven by either the clock signal Clk, or the comparator output CMP, depending on the DCB level. An SS input of the latch 65 is driven by a NOR of the DCB signal and the comparator output CMP.

The graph of FIG. 7 starts with back emf $B_{emf}$ lower than half the battery voltage, and with top sensing. When the back emf $B_{emf}$ increases, the PWM duty cycle of the controller output Out increases. When the duty cycle is going above 50%, then $I_{req}$ is not reached within the period (i.e. duty cycle is one period 100%), so the DCB signal goes low and bottom sensing starts. The duty cycle then further increases. When the back emf $B_{emf}$ drops, the duty cycle decreases to 50%, and below 50% again $I_{req}$ is not reached within the period (i.e. duty cycle is one period 0%), then the DCB signal goes high. Top sensing resumes and the duty-cycle can further decrease below 50% without oscillations.

Applications and Concluding Remarks

Embodiments of the invention are applicable to:

Any sort of full bridge drive

Any sort of inductive load

Any sort of current sensing in coils

Advantages include:

Full control of PWM frequency. This can have a variety of benefits such as reduction of audible noise possible by designing PWM frequency above 20 kHz independent of system parameters or their variations. Also there is better control over thermal effects related to dissipation during PWM switching.

Full current control 0% to 100% of PWM duty cycle is possible.

Compact solution: no mixed decay mode, only one decay mode per period.

It can be implemented with simple logic gates, no need for complexity and cost of a microprocessor or complex logic. It can be easily formed in an integrated circuit, or as a system with its associated load such as a motor or motors, and other parts such as parts being moved by the motor. Thus it can be made more reliable for rugged environments such as automotive electronics and can be cost effective.

It is useful for controlling any sort of electric motors, particularly in stepper motor drivers. It could increase acceptance of the stepper motor driver products because of improved audible noise. Especially in automotive HVAC (heating ventilation and air conditioning) market, this is highly desired as the actuator flaps are in contact with the air-flow that is transported in the passenger compartment. The PWM controllers described can also be used in conjunction with other inductive loads.

As has been described, a PWM controller for a bridge driver circuit for controlling current in an inductive load such as a motor, can set the driver into a forward mode, a slow decay mode or a fast decay mode, and can switch from slow decay mode into forward mode or into fast decay mode for the duration of pulses at a controlled frequency to provide pulse width modulated control of the current. This is a simpler control scheme avoiding complex switching schemes related to mixed mode decay. By using a known frequency, it is easier to avoid the problems of variable frequency such as increased heat dissipation or acoustic noise generation. It can have a selector for selecting top or bottom sense switching, avoiding duty-cycle oscillations and enabling a wider range of PWM duty-cycles to be used (e.g. 0% to 100%), which is useful to compensate for Back emf influence on coil-drive.

What is claimed and desired secured by United States Letters Patent is:

1. A controller for a bridge driver circuit for controlling current in an inductive load, the controller including one single pulse width modulator and one single current sensor providing feedback to the controller, the controller being arranged to set the driver into a forward mode, a slow decay mode or a fast decay mode, and being arranged to switch from slow decay mode into forward mode or into fast decay mode at controlled time intervals to provide pulse width modulated control of the current whereby both, the switching into said forward mode and the switching into said fast decay mode is done under the control of said single pulse width modulator.

2. The controller of claim 1 having a selector for selecting top or bottom sense switching.

3. The controller of claim 2, the selector being arranged to select according to a duty cycle of an output of the controller.

4. The controller of claim 3, having a detector for detecting when the duty cycle reaches a pre-determined value between 0.5 and 1, and using this to make the selection.

5. The controller of claim 1, having a latch for outputting a drive control signal, the latch being set by a clock signal and reset by a signal indicating a current in the inductive load has reached a desired level.

6. The controller of claim 1, arranged to delay a switching of the bridge driver to provide a guard band to avoid an overlap between modes.

7. A pulse width modulation controller for controlling current in an inductive load, according to a comparison of a desired and a measured current, the controller including only one single pulse width modulator, the controller being arranged to carry out top sensing where for each pulse the current is driven up until it reaches the desired value, then allowed to decay, or to carry out a bottom sensing where for each pulse the current is driven away from the desired value and allowed to decay towards the desired value, the controller having a selector for selecting top or bottom sense switching.

8. The controller of claim 7, the selector being arranged to select according to a duty cycle of an output of the controller.

9. An integrated circuit comprising:
a controller for a bridge driver circuit for controlling current in an inductive load, the controller including one single pulse width modulator and one single current sensor providing feedback to the controller, the controller being arranged to set the driver into a forward mode, a slow decay mode or a fast decay mode, and being arranged to switch from slow decay mode into forward mode or into fast decay mode at controlled time intervals to provide pulse width modulated control of the current.

10. An integrated circuit comprising:
a pulse width modulation controller for controlling current in an inductive load, according to a comparison of a desired and a measured current, the controller including only one single pulse width modulator, the controller being arranged to carry out top sensing where for each pulse the current is driven up until it reaches the desired value, then allowed to decay, or to carry out a bottom sensing where for each pulse the current is driven away from the desired value and allowed to decay towards the desired value, the controller having a selector for selecting top or bottom sense switching.

11. A system comprising:
a motor; and
a controller for a bridge driver circuit for controlling current in the motor, the controller including one single pulse width modulator and one single current sensor providing feedback to the controller, the controller being arranged to set the driver into a forward mode, a slow decay mode or a fast decay mode, and being arranged to switch from slow decay mode into forward mode or into fast decay mode at controlled time intervals to provide pulse width modulated control of the current whereby both, the switching into said forward mode and the switching into said fast decay mode is done under the control of said single pulse width modulator.

12. A system comprising:
a motor; and
a pulse width modulation controller for controlling current in the motor, according to a comparison of a desired and a measured current, the controller including only one single pulse width modulator, the controller being arranged to carry out top sensing where for each pulse the current is driven up until it reaches the desired value, then allowed to decay, or to carry out a bottom sensing where for each pulse the current is driven away from the desired value and allowed to decay towards the desired value, the controller having a selector for selecting top or bottom sense switching.

13. A method of controlling a current in an inductive load by switching between a forward mode, a slow decay mode or a fast decay mode, the method having the act of switching from slow decay mode into forward mode or into fast decay mode for the duration of pulses at controlled time intervals to provide pulse width modulated control of the current whereby a single pulse width modulator is controlling the time and duration of said pulses at controlled time intervals for said switching into forward mode and for said switching into fast decay mode.

14. The method of claim 13, further comprising selecting top or bottom sense switching.

15. The method of claim 14, wherein the selection is made according to a duty cycle of an output of the controller.

16. The method of claim 15, further comprising detecting when the duty cycle reaches a pre-determined value between 0.5 and 1, and using this to make the selection.

17. The method of claim 13, further comprising sensing a current in the inductive load to provide feedback control.

18. The method of claim 13, further comprising outputting a drive control signal which is set by a clock signal and reset by a signal indicating a current in the inductive load has reached a desired level.

19. The method of claim 13, further comprising delaying a switching to provide a guard band to avoid an overlap between modes.

20. A method of controlling a current in an inductive load by pulse width modulation according to a comparison of a desired and a measured current, the measured current being delivered by one single current sensor and the pulse width modulation obtained from one single pulse width modulator, the method having the act of selecting between top sensing where for each pulse the current is driven up until it reaches the desired value, then allowed to decay, or bottom sensing where for each pulse the current is driven away from the desired value and allowed to decay towards the desired value.

21. The method of claim 20, wherein the selecting is arranged according to a duty cycle or an output of a controller.

* * * * *